United States Patent
Kamijoh et al.

(10) Patent No.: US 7,593,528 B2
(45) Date of Patent: *Sep. 22, 2009

(54) MANAGING DEVICE KEYS IN CRYPTOGRAPHIC COMMUNICATION

(75) Inventors: Kohichi Kamijoh, Kanagawa-ken (JP); Masaharu Sakamoto, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 54 days.

This patent is subject to a terminal disclaimer.

(21) Appl. No.: 11/853,932

(22) Filed: Sep. 12, 2007

(65) Prior Publication Data

US 2008/0075291 A1 Mar. 27, 2008

(30) Foreign Application Priority Data

Sep. 21, 2006 (JP) ............................. 2006-255183

(51) Int. Cl.
*H04L 9/12* (2006.01)

(52) U.S. Cl. ......................... 380/45; 380/278; 380/279; 380/281

(58) Field of Classification Search ........................ None
See application file for complete search history.

(56) References Cited

U.S. PATENT DOCUMENTS

| | | | |
|---|---|---|---|
| 6,687,375 B1 * | 2/2004 | Matyas et al. | 380/45 |
| 6,965,992 B1 * | 11/2005 | Joseph et al. | 713/153 |
| 7,340,603 B2 * | 3/2008 | Asano | 713/163 |
| 2002/0147906 A1 * | 10/2002 | Lotspiech et al. | 713/158 |
| 2004/0096063 A1 * | 5/2004 | Carroni et al. | 380/279 |

FOREIGN PATENT DOCUMENTS

JP 10-003256 6/1998

(Continued)

OTHER PUBLICATIONS

Eiji Okamoto, "An Introduction to Cryptographic Theory", Oct. 1, 1996, 6 pp. 110-112 Chapter 6 and English translation of subject matter.

(Continued)

*Primary Examiner*—Emmanuel L Moise
*Assistant Examiner*—David J Pearson
(74) *Attorney, Agent, or Firm*—Patrick J. Daugherty; Driggs, Hogg, Daugherty & Del Zoppo Co., LPA

(57) ABSTRACT

To delegate authority for cryptographic communication without increasing the risk of leaking a device key. A system and method including a first communication apparatus and a managing apparatus allowing the first communication apparatus to perform cryptographic communication with an external at least one second communication apparatus. The managing apparatus includes: storing a first device key shared with the second communication apparatus; generating a computation by passing the first device key read from the stored keys to a keyed one-way function, to generate a computed result as a second device key; and outputting the second device key and a key of the one-way function to the first communication apparatus. The first communication apparatus transmits a key of a one-way function to the second communication apparatus causing the second communication apparatus to perform a computation which generates a second device key, and which performs a cryptographic communication with a second communication apparatus.

10 Claims, 13 Drawing Sheets

FOREIGN PATENT DOCUMENTS

| | | |
|---|---|---|
| JP | 2005051727 | 2/2005 |
| JP | 2005539423 A | 12/2005 |
| WO | 200402589 A1 | 3/2004 |
| WO | 2005/038818 A1 | 4/2005 |

OTHER PUBLICATIONS

Encryption and Information Security Symposium, "tree-based key management system employing a trapdoor one-way function", Jan. 26, 2003 and English translation of subject matter.

The 2004 Symposium on Cryptography and Information Security, "efficient tree-based key management systems employing one-way functions" Jan. 27, 2004 Sections 1-4 and English translation of subject matter.

Naor et al., Revocation and Tracing Schemes for Stateless Receivers, Lecture Notes In Computer Science; Feb. 24, 2001, 33 pgs, vol. 2139, Springer-Verlag London.

Lotspiech et al., Broadcast Encryption's Bright Future, IEEE—Computer, Aug. 2002, pp. 57-63, vol. 35.

Noar et al. Protecting Cryptographic Keys: The Trace and Revoke Approach, IEEE Computer, Jul. 2003, pp. 47-53, vol. 36, Issue No. 7.

Kamijo, Broadcast Encryption with Tree Re-arrangement Function, Tokyo Research Laboratory, IBM Japan, 2004.

* cited by examiner

220

| FIRST CIPHER KEY | SECOND CIPHER KEY | HASH KEY | ID OF FIRST COMMUNICATION APPARATUS | ID OF SECOND COMMUNICATION APPARATUS |
|---|---|---|---|---|
| $D_3$ | $D_3^{[1]}$ | | | $U_9$-$U_{16}$ |
| $D_6$ | $D_6^{[1]}$ | | | $U_9$-$U_{12}$ |
| $D_7$ | $D_7^{[1]}$ | | | $U_{28}$-$U_{31}$ |
| $D_{12}$ | $D_{12}^{[1]}$ | | | $U_9, U_{10}$ |
| $D_{13}$ | $D_{13}^{[1]}$ | | | $U_{11}, U_{12}$ |
| $D_{14}$ | $D_{14}^{[1]}$ | Kh1 | $S_1$ | $U_{28}, U_{29}$ |
| $D_{15}$ | $D_{15}^{[1]}$ | | | $U_{30}, U_{31}$ |
| $D_{24}$ | $D_{24}^{[1]}$ | | | $U_9$ |
| $D_{25}$ | $D_{25}^{[1]}$ | | | $U_{10}$ |
| ⋮ | ⋮ | | | ⋮ |
| $D_2$ | $D_2^{[1]}$ | | | $U_1$-$U_8$ |
| $D_4$ | $D_4^{[1]}$ | | | $U_1$-$U_4$ |
| ⋮ | ⋮ | Kh2 | $S_k$ | ⋮ |

FIG. 5

3, Kh1, Kh2, Kh3, 24, 27, Enc($D_{24}^{[3]}$, $K_t$), Enc($D_{27}^{[3]}$, $K_t$), Enc($K_t$, C)
⎵ 910  ⎵ 920  ⎵ 920  ⎵ 930

MANAGING DEVICE KEYS IN CRYPTOGRAPHIC COMMUNICATION

RELATED APPLICATION

This application is related to and shares a common disclosure with commonly-assigned copending application, U.S. application Ser. No. 11/853917, titled MANAGING DEVICE KEYS IN CRYPTOGRAPHIC COMMUNICATION, filed Sep. 12, 2007.

BACKGROUND OF THE INVENTION

The present invention relates to cryptographic communication. In particular, the present invention relates to a method for managing and generating a device key in cryptographic communication.

Broadcast encryption is used as a method for allowing a broadcasted encrypted content to be decrypted only by a certain group of users. In the case of the broadcast encryption, a communication apparatus of each user stores a set of device keys that is different from those of the other users, and these device keys are managed so as not to be read from the outside. The key storing section of the managing apparatus stores the device keys of all the users. In a case where a content creator desires to deliver an encrypted content, he/she firstly encrypts the content with an arbitrary encryption key (referred to as a title key below), and then transmits the encrypted content and the title key to the managing apparatus, thereby making a request to the managing apparatus to deliver the encrypted content.

The managing apparatus encrypts the received title key with each of device keys owned only by the users who are permitted to decrypt, and generates a set of encrypted title keys (called media key block (MKB)). Then, the managing apparatus broadcasts the encrypted content to the users in association with the set of encrypted title keys. As such, the broadcast encryption has a feature that users permitted for decryption can be arbitrarily selected without limiting destinations for content delivery. Moreover, since the broadcast encryption is based on common key cryptosystem, the broadcast encryption has advantages that encryption requires only a slight increase in data size, and that a processing load for encryption and decryption is small. In fact, this encryption method has already been put into practical use for content protection for prerecorded media (CPPM), content protection for recordable media (CPRM) and the like.

"Japanese Patent Application Laid-open Publication No. 2005-051727" and "Japanese Patent Translation Publication No. 2005-539423" are examples of a reference technique of the present invention. In the case of the technique described in "Japanese Patent Application Laid-open Publication No. 2005-051727" and "Japanese Patent Translation Publication No. 2005-539423", when generating device keys corresponding to the respective nodes in a hierarchical structure, such as a tree structure, a device key corresponding to a node in a lower level is generated by using a device key corresponding to a node in a higher level. This realizes a function of enabling only certain users to decrypt an encrypted content by selecting an arbitrary subtree in a tree structure of data, and the equivalent function, while reducing the number of pre-prepared device keys.

In the case of the broadcast encryption, an encrypted content usually can be delivered only by a managing apparatus that manages device keys of all users. Accordingly, when a content creator desires to deliver a content, the creator has to make a request to the managing apparatus to execute encryption processing on the content by transmitting the content to the managing apparatus. Moreover, since a plurality of content creators may possibly exist, a processing load for encryption is likely to be centralized to the managing apparatus. In addition, when the managing apparatus is out of operation due to maintenance, the encryption is delayed until the managing apparatus restarts operation.

These problems may be solved by decentralizing the processing in a way that the managing apparatus provides replicas of device keys to other apparatus. However, sharing of device keys replicas by the plurality of apparatus is likely to increase the risk of leakage of device keys, and also is likely to make it difficult to identify a leaking apparatus. For example, suppose a case where device keys stored in a managing apparatus of a parent company are replicated in an apparatus of a subsidiary company, and where the replicated device keys are further replicated in an apparatus of a sub-subsidiary company. In this case, when one device key is leaked, it is difficult to specify whether the device key is leaked from the subsidiary company or from the sub-subsidiary company. Moreover, stopping use of the leaked device keys may cause normal cryptographic communication to become impossible, since it is difficult to change the device keys stored in communication apparatus of users.

The foregoing reference technique is used for generating a set of device keys managed in a tree structure, and this is applied to processing of generating device keys that should be stored in communication apparatus of users in the broadcast encryption. Accordingly, the reference technique cannot achieve reduction in a load centralized to a managing apparatus, or in the risk of key leakage.

SUMMARY OF THE INVENTION

Against this background, an object of the present invention is to provide a system, a managing apparatus, a first communication apparatus, a second communication apparatus, a method and a program product, which are capable of solving the foregoing problems. This object is achieved by combining features described in the independent claims. Moreover, the dependent claims define more advantageous specific examples of the present invention.

In order to solve the above problems, an aspect of the present invention is a system including a first communication apparatus and a managing apparatus allowing the first communication apparatus to perform cryptographic communication with an external second communication apparatus. The managing apparatus includes a key storing section, a key generating section and a key outputting section. The key storing section stores a first device key shared with the second communication apparatus. The key generating section performs a computation by passing the first device key read from the key storing section to a keyed one-way function, and thereby generates a computed result as a second device key. The key outputting section outputs the second device key and a key of the one-way function to the first communication apparatus. Meanwhile, the first communication apparatus includes a key generation controlling section and a cryptographic communication section. The key generation controlling section transmits the key of the one-way function received from the managing apparatus to the second communication apparatus, and in so doing causes the second communication apparatus to perform a computation by passing the stored first device key to the keyed one-way function, and thereby to generate a second device key. The cryptographic communication section performs the cryptographic communication with the second apparatus by using the second device key received from the managing apparatus. Moreover, another aspect of the present invention provides a program product and a method for causing an information system to function as the foregoing system.

Note that the outline of the present invention mentioned above is not an enumerated list including all of the necessary features of the present invention, and any sub-combination of these features may be included in the present invention.

BRIEF DESCRIPTION OF THE DRAWINGS

For a more complete understanding of the present invention and the advantage thereof, reference is now made to the following description taken in conjunction with the accompanying drawings.

FIG. 5 shows one example of a data structure of a generated key DB 220.

DETAILED DESCRIPTION OF THE PREFERRED EMBODIMENT

Hereinafter, the present invention will be described by using an embodiment of the present invention. However, the present invention according to the scope of claims is not limited to the following embodiment, and all the combinations of features described in the embodiment are not always required for solving means of the invention.

Figure 1:
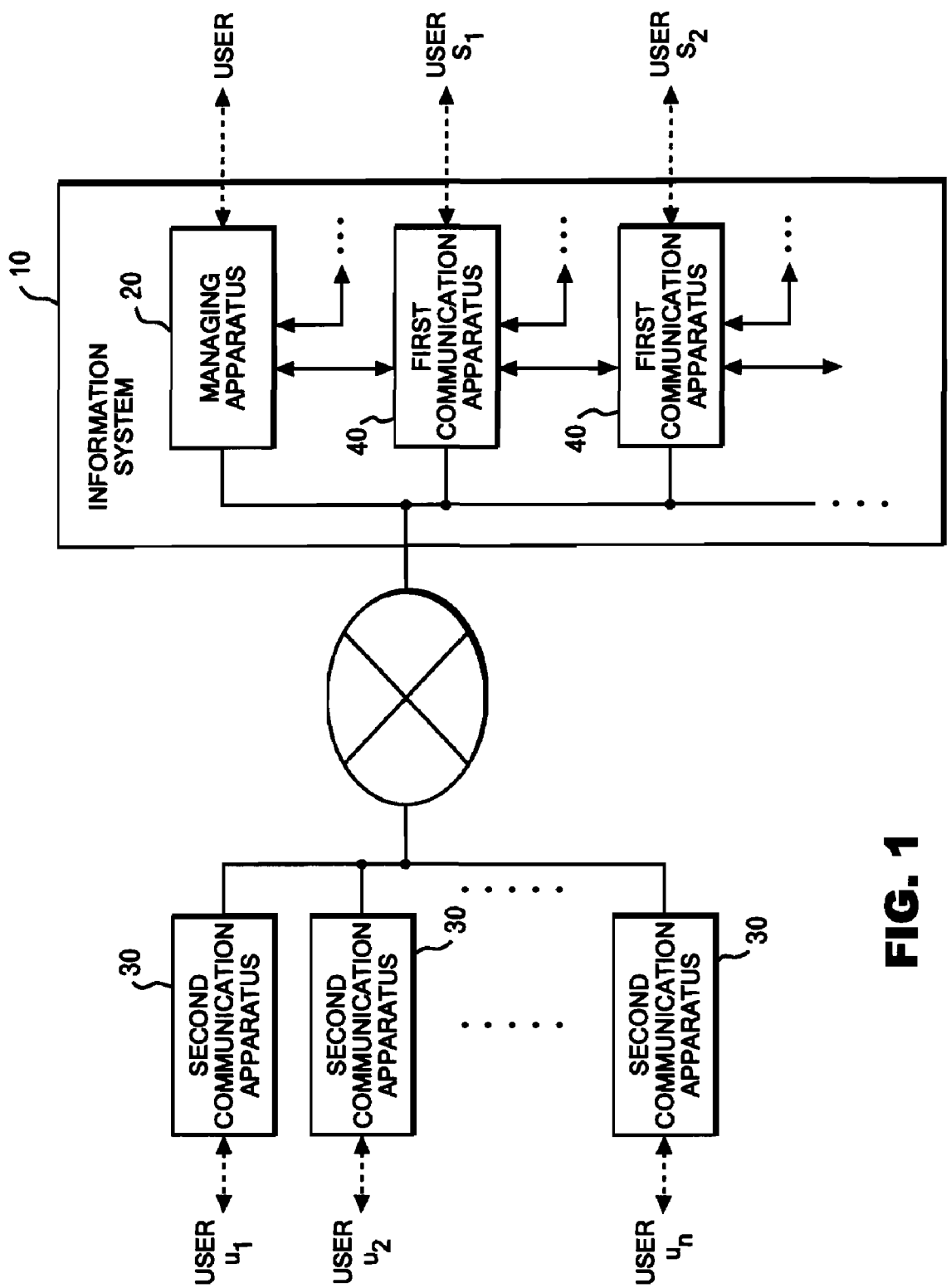
FIG. 1 shows a connection relationship between an information system 10 and a plurality of second communication apparatus 30.

FIG. 1 shows a connection relationship between an information system 10 and a plurality of second communication apparatus 30. The information system 10 is installed in a group constituting a business group or the like, and includes a managing apparatus 20 and a plurality of first communication apparatus 40. The managing apparatus 20 is managed by a parent company, for example. Each of the plurality of first communication apparatus 40 is managed by one of subsidiary companies or affiliate companies ($S_1$-$S_m$), for example. Each of the plurality of second communication apparatus 30 is a personal computer or a broadcasting receiver managed by one of individual users ($u_1$-$u_n$). Each of the plurality of second communication apparatus 30 is installed outside the information system 10, and is connected to the information system 10 through a telecommunication line which is available to the general public. Examples of this telecommunication line include a public telephone line, the Internet, a public broadcasting network and the like.

The managing apparatus 20 manages at least one device key for cryptographic communication, and shares each device key with a corresponding one of the second communication apparatus 30. For example, device keys are stored in advance in each of the second communication apparatus 30 at a time of shipment as a commercial product from a factory, and these device keys are managed so as not to be readable and rewritable from the outside. In response to a request from a certain first communication apparatus 40, the managing apparatus 20 allows that first communication apparatus 40 to perform the cryptographic communication with a second communication apparatus 30. For example, the managing apparatus 20 generates new device keys by using the already-managed device keys, provides the new device keys to the first communication apparatus 40, and allows the first communication apparatus 40 to make the cryptographic communication by using the new device keys. At this time, by providing a key of a one-way function used for generating these new device keys, the managing apparatus 20 causes the first communication apparatus 40 to transmit the key to the second communication apparatus 30 that is a transmission destination, and allows the second communication apparatus 30 to generate the new device keys as well. It should be noted that the computing content of this one-way function itself may be open to the public so that the content can be referred by any of the second communication apparatus 30. This allows the second communication apparatus 30 to generate the new device keys only on condition that the key of the one-way function is provided to the second communication apparatus 30.

The information system 10 of this embodiment aims to distribute a load required for content delivery and encryption processing among the first communication apparatus 40 without increasing the risk of leaking existing device keys, which is difficult to change, in a way that new device keys are generated and provided by using the already-shared existing device keys.

Figure 2:
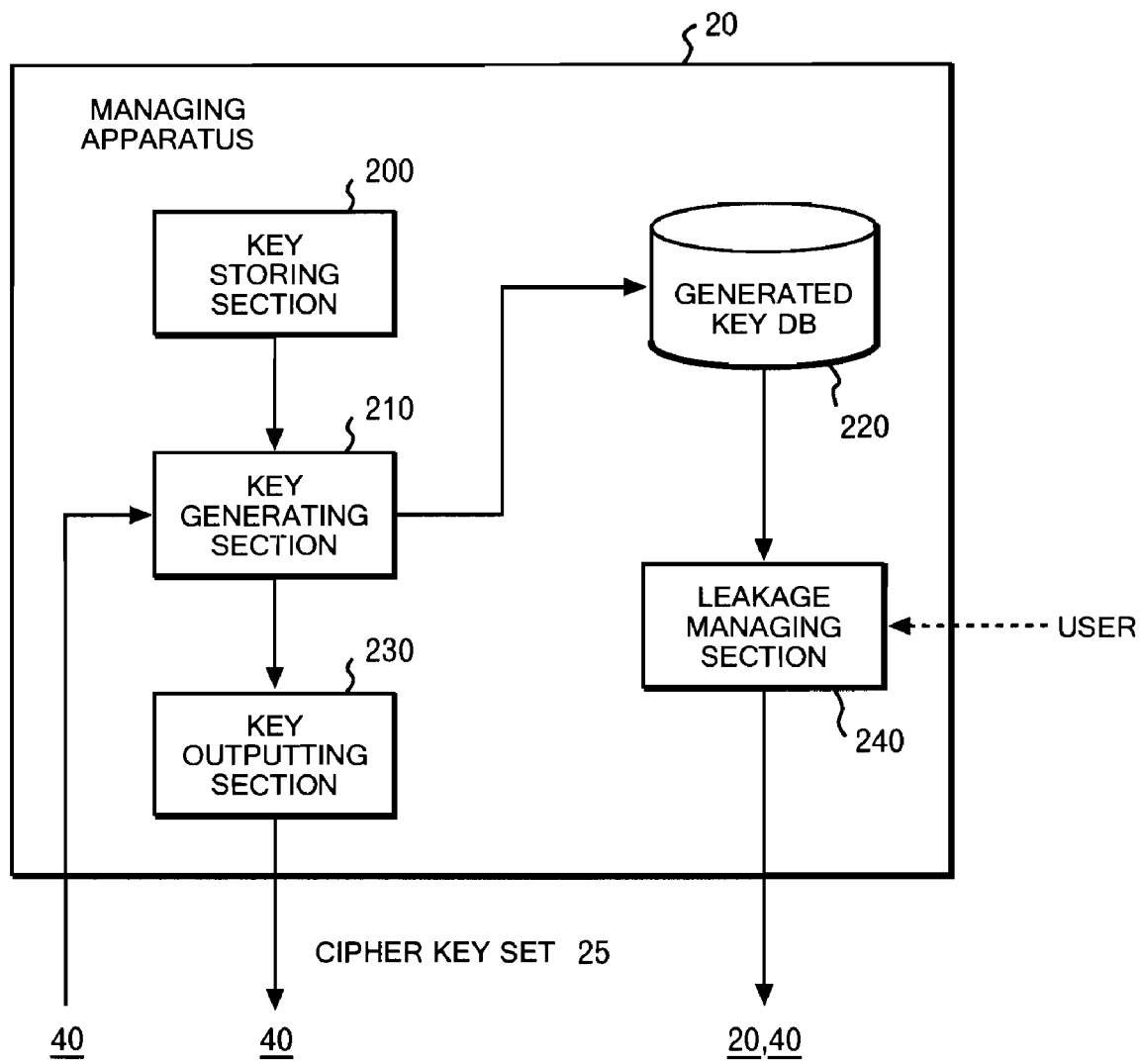
FIG. 2 shows a functional configuration of a managing apparatus 20.

FIG. 2 shows a functional configuration of the managing apparatus 20. The managing apparatus 20 includes a key storing section 200, a key generating section 210, a generated key DB 220, a key outputting section 230 and a leakage managing section 240. The key storing section 200 stores a plurality of first device keys which are shared by the managing apparatus 20 and at least one of the second communication apparatus 30 for the purpose of selectively allowing some of the second communication apparatus 30 to decrypt encrypted data broadcasted to the plurality of second communication apparatus 30. A configuration of this plurality of first device keys is illustrated in FIG. 3.

Figure 3:
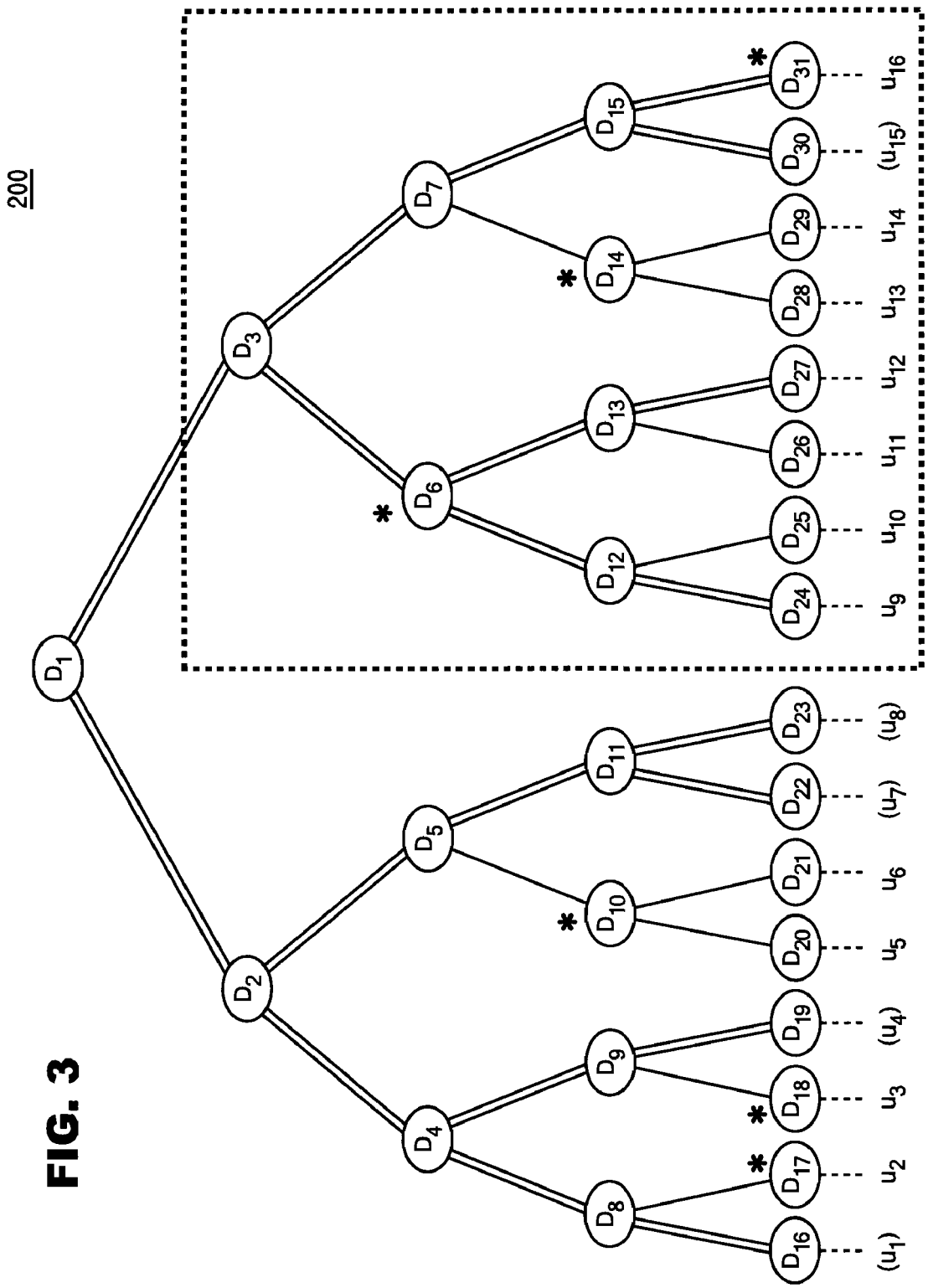
FIG. 3 shows a structure of first device keys managed in a hierarchical structure in a key storing section 200.

FIG. 3 shows the configuration of the first device keys managed in a hierarchical structure in the key storing section 200. 16 second communication apparatus 30 are managed by 16 users ($u_1$-$u_{16}$), respectively. The plurality of second communication apparatus 30 are respectively associated with leaf nodes in a multiway tree structure (here, a perfect binary tree structure) data. The key storing section 200 stores the plurality of first device keys respectively in association with different nodes in this multiway tree structure data. The nodes described here include the foregoing leaf nodes as well. Specifically, the root node is associated with a first device key $D_1$, and its child nodes are associated with first device keys $D_2$ and $D_3$, respectively. Moreover, descendant nodes are associated with first device keys $D_4$ to $D_{15}$, respectively, and the leaf nodes are associated with first device keys $D_{16}$ to $D_{31}$, respectively.

A set of first device keys is distributed to each of the second communication apparatus 30 in advance. Here the distributed first device keys are respectively associated with all the nodes in a path to the root node from each of the leaf nodes associated with the second communication apparatus 30. To be more specific, for example, the first device keys $D_{21}$, $D_{10}$, $D_5$, $D_2$ and $D_1$ are distributed to the second communication apparatus 30 of the user $u_6$. The key storing section 200 manages and stores these first device keys $D_1$ to $D_{31}$ so that this multiway tree structure can be recognized. For example, the key storing section 200 may store data in a graph structure consisting of the set of the nodes shown in FIG. 3 and a set of edges that establish connections between the nodes, or may store each of the first device keys in association with information specifying the second communication apparatus 30 to which the first device keys are distributed, or specifying a user thereof.

Even if encrypted data itself is broadcasted to all the second communication apparatus 30, managing the first device keys in such a structure makes it possible to arbitrarily select a second communication apparatus 30 to be enabled to decrypt the encrypted data. For instance, suppose that it is not desired that the users $u_1$, $u_4$, $u_7$, $u_8$ and $u_{15}$ decrypt the encrypted data. In this case, the managing apparatus 20 firstly excludes the first device keys delivered to the second communication apparatus 30 of the above users from all the managed first device keys. As a result, the first device keys in the paths shown by double lines in FIG. 3, that is, the first device keys $D_1$ to $D_5$, $D_7$ to $D_9$, $D_{11}$, $D_{15}$, $D_{16}$, $D_{19}$, $D_{22}$, $D_{23}$ and $D_{30}$ are excluded. Then, the managing apparatus 20 selects the remaining first device keys after the exclusion as device keys to be used for encryption. Preferably, in a case where there is a plurality of first device keys in an ancestor-descendant relationship among these selected first device keys, the managing apparatus 20 selects only the first device key that is the oldest ancestor among the plurality of first device keys, and does not select the other first device keys. As a result, as shown with marks * in FIG. 3, the first device keys $D_6$, $D_{10}$, $D_{14}$, $D_{17}$, $D_{18}$ and $D_{31}$ are selected. By encrypting data, which is to be transmitted, with each of these first device keys, each of the desired users can decrypt the data by using the device keys owned by his/her second communication apparatus 30.

The description returns to FIG. 2. From any one of the first communication apparatus 40, the key generating section 210 receives a request to delegate authority for cryptographic communication with a plurality of second communication apparatus 30. For example, from the first communication apparatus 40, the key generating section 210 may receive an input specifying at least one of the second communication apparatus 30 to be enabled to decrypt encrypted data broadcasted by the first communication apparatus 40, or may receive an input specifying a group of the second communication apparatus 30 to be enabled to decrypt such encrypted data. In a case where a first communication apparatus 40 specifies a certain second communication apparatus 30, the key generating section 210 reads, from the key storing section 200, the first device keys shared with the specified second communication apparatus 30, and executes a computation by passing the read-out first device keys to a keyed one-way function. Thus, the key generating section 210 generates a computed result as a second device keys.

In a case where a first communication apparatus 40 specifies a group of second communication apparatus 30 to be enabled to decrypt encrypted data, the key generating section 210 reads, from the key storing section 200, each of the first device keys in subtrees including the specified group in the multiway tree structure shown in FIG. 3. Then, the key generating section 210 executes a computation by passing each of the read-out first device keys to the keyed one-way function. Thus, the key generating section 210 generates each of computed results as a corresponding one of second device keys. The generated second device keys and the key of the one-way function used for the generation are stored in the generated key DB 220. In addition, the key outputting section 230 outputs the second device keys and the key of the one-way function to the first communication apparatus 40 having requested to be authorized. A plurality of second device keys may be outputted in combination, and the combination of second device keys is called a device key set 25. By referring to FIGS. 3 and 4, one example of processing for generating second device keys will be explained below.

Figure 4:
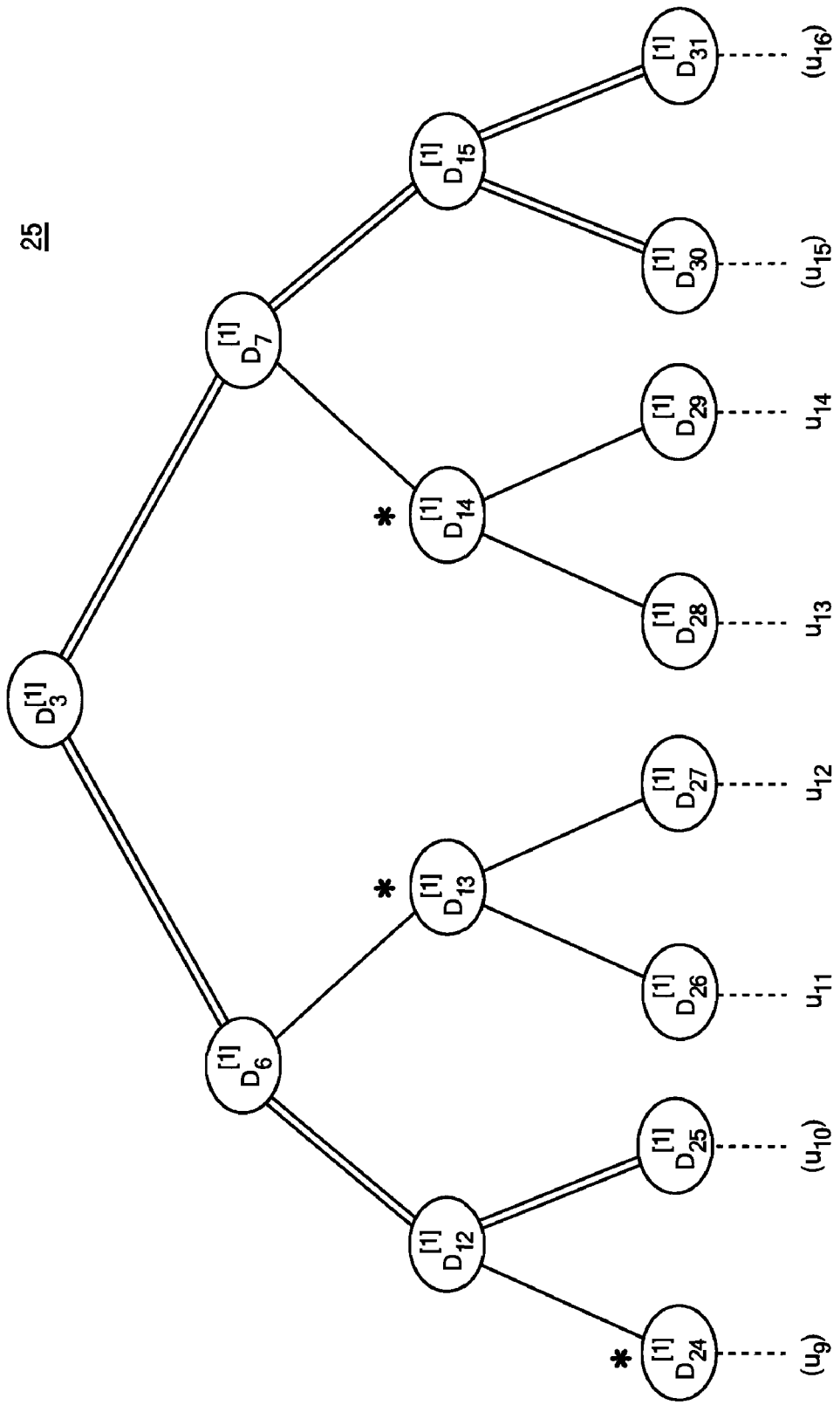
FIG. 4 shows a configuration of a device key set 25 that is one example of second device keys.

FIG. 4 shows a configuration of the device key set 25 which is one example of the second device keys. When a group consisting of users $u_9$ to $u_{16}$ is specified, the key generating section 210 generates these second device keys respectively by using the first device keys shown in a rectangular indicated by a dotted line in FIG. 3. Specifically, when this group is specified, the key generating section 210 reads all the first device keys in the subtrees including this specified group, from the key storing section 200. The read-out first device keys are the respective device keys $D_3$, $D_6$, $D_7$, $D_{12}$ to $D_{15}$ and $D_{24}$ to $D_{31}$.

Thereafter, the key generating section 210 executes a computation by passing each of the first device keys to the keyed one-way function. The keyed one-way function may be a keyed hash function, or an encryption function based on a predetermined device key, for example. In addition, the one-way function is a function performing the computation with which it is possible to generate an output value from an input value, but with which it is impossible or extremely difficult to generate an input value from an output value. For example, the one-way function may be a function which requires an extremely long processing time for generating an input value from an output value, in comparison with that for generating an output value from an input value.

The computed result obtained by passing each first device key to the keyed one-way function is generated as the second device key. The second device keys thus generated are the respective device keys $D^{[1]}_3$, $D^{[1]}_6$, $D^{[1]}_7$, $D^{[1]}_{12}$ to $D^{[1]}_{15}$ and $D^{[1]}_{24}$ to $D^{[1]}_{31}$. Note that each second device key is expressed by adding a suffix [1] thereto in order to differentiate it from the first device keys and later-descried third device keys. An arithmetic expression for generating the second device key $D^{[1]}_i$ from the first device key $D_i$ is expressed as the following equation, where a function H( ) denotes the keyed one-way function, and where a kh1 denotes the key of the function:

$$D^{[1]}_i = H(Kh1, D_i).$$

Here, the computing content of the function H is open to at least the managing apparatus 20 and each of the first communication apparatus 40.

The second device keys constitute a multiway tree structure same as the multiway tree structure composed of the corresponding first device keys. The key outputting section 230 outputs all the second device keys to the first communication apparatus 40 having requested to be authorized. Preferably, the key outputting section 230 outputs each of the second device keys in association with information that allows this multiway tree structure to be identified. For example, the key storing section 200 may store data in a graph structure consisting of the nodes shown in FIG. 4 and edges that establish connections between the nodes, or may store each of the second device keys in association with information specifying the second communication apparatus 30 to which the corresponding first device keys are distributed, or specifying a user thereof.

Even if encrypted data itself is broadcasted to all the second communication apparatus 30, generating the second device keys in such a structure makes it possible to arbitrarily select a second communication apparatus 30 to be enabled to decrypt the encrypted data. For instance, here, suppose that it is not desired that the users $u_{10}$, $u_{15}$ and $u_{16}$ decrypt the encrypted data. In this case, a cryptographic communication section 610 of the first communication apparatus 40 firstly excludes the second device keys delivered to the second communication apparatus 30 of the above users from all the second device keys. As a result, the second device keys in the paths shown by double lines in FIG. 4, that is, $D^{[1]}_3$, $D^{[1]}_6$, $D^{[1]}_7$, $D^{[1]}_{12}$, $D^{[1]}_{15}$, $D^{[1]}_{25}$, $D^{[1]}_{30}$ and $D^{[1]}_{31}$ are excluded. Thereafter, the cryptographic communication section 610 selects the remaining second device keys after this exclusion as device keys used for encryption. Preferably, in a case where there is a plurality of second device keys in an ancestor-descendant relationship among these selected second device keys, the cryptographic communication section 610 selects only the second device key that is the oldest ancestor among the plurality of second device keys, and does not select the other second device keys. As a result, as shown with marks * in FIG. 4, the second device keys $D_{13}$, $D_{14}$ and $D_{24}$ are selected. By encrypting data, which is to be transmitted, by using each of these second device keys, the cryptographic communication section 610 can arbitrarily select at least a part of a group of the second device communication apparatus 30 with which the first communication apparatus has been authorized to perform the cryptographic communication, and then can perform the cryptographic communication with the selected ones.

The description returns to FIG. 2. The generated key DB 220 stores the second device keys generated by the key generating section 210. FIG. 5 shows one example of the stored second device keys.

FIG. 5 shows one example of a data structure of the generated key DB 220. The generated key DB 220 stores the first device keys used for generating the respective second device keys, the second device keys themselves, the key (the hash key) of the one-way function used for the generation of the second device keys, identification information of the first communication apparatus which has requested to generate the second device keys, and which has obtained the same, and users each enabled to decrypt the data encrypted with the corresponding second device key, in association with one another. For example, the second device key $D^{[1]}_3$ is generated by performing a computation by passing the first device key $D_3$ to the keyed one-way function with the hash key Kh1. The identification information of the first communication apparatus which has requested this second device key $D^{[1]}_3$, has also obtained the same is $S_1$. In addition, the users $u_9$ to $u_{16}$ are enabled to decrypt the data encrypted with this second device key.

When the key generating section 210 receives a plurality of requests to generate the second device keys, the generated key DB 220 stores the second device keys so that the second device keys generated in response to each of the plurality of requests can be distinguished from those of the other requests. For example, when the key generating section 210 receives a request to generate second device keys from the first communication apparatus $S_k$, the generated key DB 220 generates another hash key Kh2 for the first communication apparatus $S_k$. Note that the hash key may be generated with a different value in accordance with a predetermined rule every time the one-way function is used, or may be generated by using random number. If the key generating section 210 reads the first device key $D_2$ in response to this request, the key generating section 210 generates the second device key $D^{[1]}_2$ by performing a computation by passing the first device key $D_2$ to the one-way function with the hash key kh2. In this case, the generated key DB 220 stores the first device key $D_2$, the second device key $D^{[1]}_2$, the hash key Kh2, $S_k$ that is an ID of the first communication apparatus, and the users $u_1$ to $u_8$ enabled to decrypt data encrypted with the second device keys, in association with one another.

The description returns to FIG. 2. In response to an input by a user about a leakage of a device key, the leakage managing section 240 performs processing for disabling the device keys to be used according to the information stored in the generated key DB 220. For example, in response to an input indicating that one of the second device keys has become unusable for the cryptographic communication as a result of an event where the second device key has become leaked to a third party, the leakage managing section 240 reads the key of the one-way function corresponding to the second device keys, from the generated key DB 220. In other words, this key of the one-way function is the one used for generating the second device keys. Then, the leakage managing section 240 encrypts the read-out key with the first device keys corresponding to the second device keys, and transmits the encrypted key to the second communication apparatus 30. In this way, the leakage managing section 240 notifies the second communication apparatus 30 that the second device keys, which have been generated with this key of the one-way function, have become unusable. Since the data encrypted with the first device keys as described above can be decrypted only by the specific users, the transmission of the notice may be implemented by broadcasting to all the second communication apparatus 30. Upon reception of this, the second communication apparatus 30 performs a computation by passing the stored first device keys to the one-way function using the received key of the one-way function, and manages the second device keys generated as a result of the computation, as an unusable device keys in the cryptographic communication after this moment. For instance, in a case where the second communication apparatus 30 receives data encrypted with these second device keys in the cryptographic communication thereafter, the second communication apparatus 30 may abandon the data received in the cryptographic communication.

In addition to this, the leakage managing section 240 may notify the first communication apparatus 40 that a first device keys have been leaked to the third party. To be more specific, when the leakage managing section 240 receives one of the first device keys that have become unusable in the cryptographic communication as a result of an event where the first device keys have been leaked to the third party, the leakage managing section 240 reads the second device keys stored in association with the first device keys from the generated key DB 220. These second device keys are the ones generated from this first device keys by the key generating section 210. Then, the leakage managing section 240 transmits a signal indicating these second device keys for the purpose of notifying the first communication apparatus 40 that the read-out second device keys are invalidated. Upon reception of this signal, the first communication apparatus 40 performs processing for invalidating the second device keys in the first communication apparatus 40. For instance, the first communication apparatus 40 may erase the second device keys. Instead, even when the first communication apparatus 40 receives the data encrypted with the second device keys, the first communication apparatus 40 may discard the encrypted data.

Figure 6:
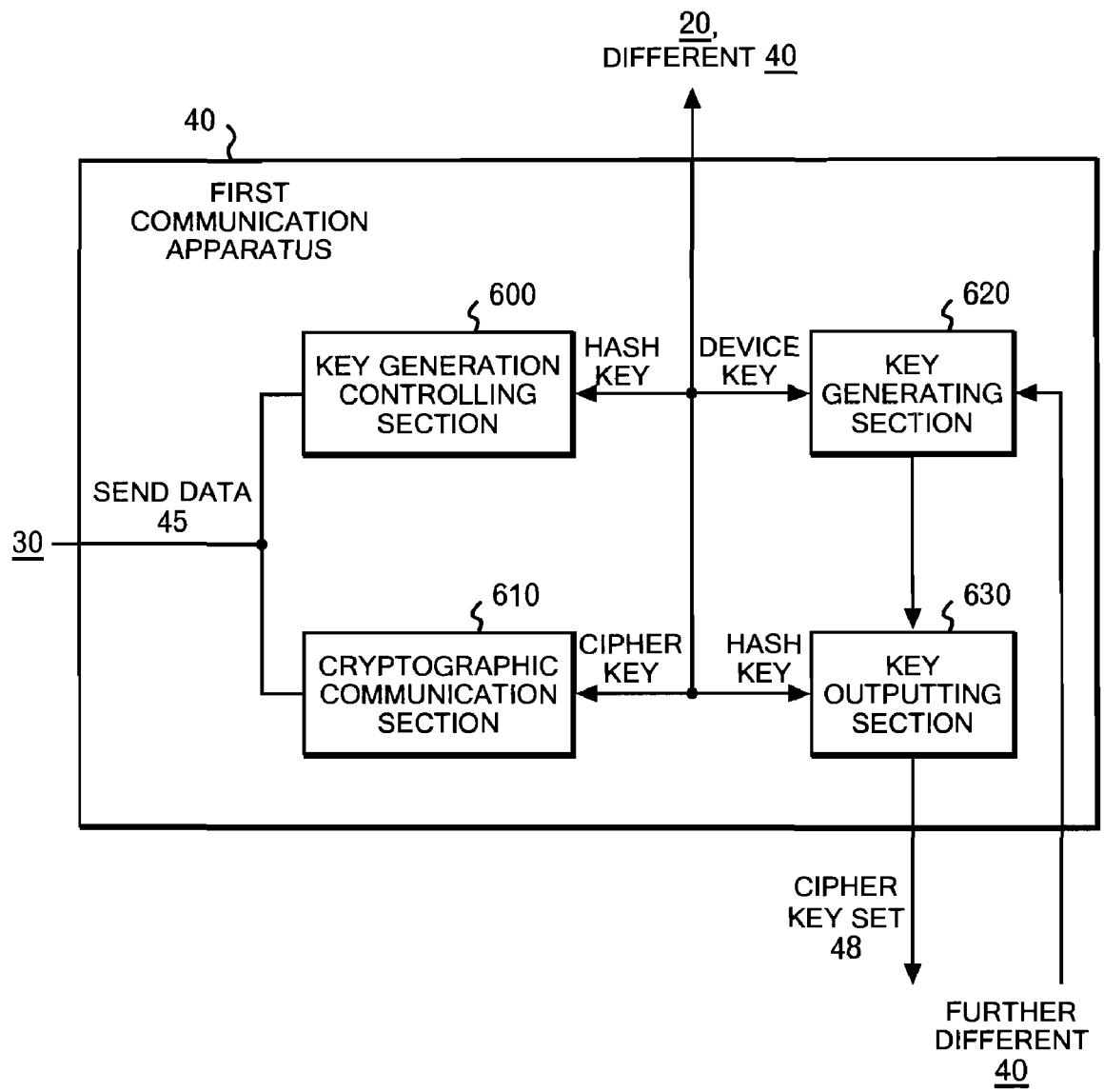
FIG. 6 shows a functional configuration of a first communication apparatus 40.

FIG. 6 shows a functional configuration of the first communication apparatus 40. The first communication apparatus 40 includes a key generation controlling section 600, the cryptographic communication section 610, a key generating section 620 and a key outputting section 630. To the second communication apparatus 30, the key generation controlling section 600 transmits the key of the one-way function received from the managing apparatus 20, and thereby causes the second communication apparatus 30 to generate the second device keys by performing a computation by passing the stored first device keys to the keyed one-way function. The key generation controlling section 600 may broadcast the key of this one-way function to the plurality of second communication apparatus 30 without particularly specifying destinations. Since the first communication apparatus 40 has only the second device keys received from the managing apparatus 20, the second communication apparatus 30 to be enabled to communicate with the first communication apparatus 40 are limited only to those authorized for the cryptographic communication by the managing apparatus 20 even without limiting the destinations. In addition, the key of the one-way function to be transmitted may be included for transmission in the later-described transmission data 45. The cryptographic communication section 610 performs the cryptographic communication with the second communication apparatus 30 by using the second device keys received from the managing apparatus 20. For instance, the cryptographic communication section 610 encrypts data with these second device keys, and broadcasts the encrypted data to all the second communication apparatus 30 without limiting the second communication apparatus 30 as the destinations. Thereby, the cryptographic communication section 610 performs the cryptographic communication only with the second communication apparatus 30 which has been specified in the authorization request. Encrypted data in the cryptographic communication is called the transmission data 45, and one example of the transmission data 45 is shown in FIG. 7.

Figure 7:
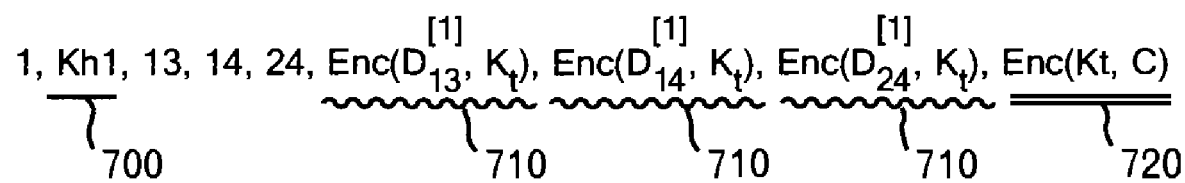
FIG. 7 shows a specific example of transmission data 45.

FIG. 7 shows the specific example of the transmission data 45. The transmission data 45 is data transmitted from the first communication apparatus 40 to the second communication apparatus 30, and includes encrypted data and the key of the one-way function. The encrypted data is sent and received in order for the cryptographic communication section 610 to perform the cryptographic communication, and the key of the one-way function is transmitted by the key generation controlling section 600 in order to cause the second communication apparatus 30 to generate the second device key. The specific description will be provided below. The transmission data 45 includes a hash key 700, a plurality of post-encrypted device keys 710 and an encrypted content 720. Each of the post-encrypted device keys 710 is obtained by encrypting a title key Kt with each of the second device keys, and the encrypted content 720 is obtained by encrypting, with the title key Kt, data C to be transmitted. Here, the encryption function for generating the post-encrypted device keys is expressed as Enc( ), and this function is shared by the managing apparatus 20, the first communication apparatus 40 and the second communication apparatus 30. The hash key 700 is one example of the key of the one-way function. If the one-way function is a keyed hash function, the key is a hash key of the hash function. Instead, if the one-way function is an encryption function, the key is a device key of the encryption function. A numerical value 1 indicates that the number of keys of the one-way function included in the transmission data 45 is only one, that is, first data element arranged immediately following the numerical value 1.

In other words, each of the second communication apparatus 30 receiving the transmission data 45 can generate the second device keys for decrypting the post-encrypted device keys 710 included in the transmission data 45 by performing a computation only once. This computation is performed by passing the previously-stored first device keys to the one-way function, and by using, as the key of the one-way function, the first data element arranged immediately following the numerical value 1. Note that, in transmission data transmitted from the managing apparatus 20 to the second communication apparatus 30, the numerical value at the head of the transmission data is set to 0, and the key of the one-way function is not included. When the data format in the transmission data is fixed uniformly as described above, the second communication apparatus 30 can appropriately decrypt transmission data received from the managing apparatus 20 and any one of the first communication apparatus 40 without having to perform processing for identifying the source of the transmission data.

In the transmission data 45, the data elements following the hash key 700 are a numerical value 13, a numerical value 14 and a numerical value 25. These numerical values indicate which second device keys have been used for encrypting the post-encrypted device key following these numerical values. To be more specific, the numerical value 13 indicates that the second device key $D^{[1]}_{13}$ based on the first device key $D_{13}$ has been used to encrypt the title key Kt which has been used for encrypting the data C to be transmitted. The numerical value 14 following the numerical value 13 indicates that the second device key $D^{[1]}_{14}$ based on the first device key $D_{14}$ has been used in the encryption of the second-subsequent post-encrypted device keys 710, and the numerical value 25 following the numerical value 14 indicates that the second device key $D^{[1]}_{25}$ based on the first device key $D_{25}$ has been used in the encryption of the third-subsequent post-encrypted device keys 710. These first device keys $D_{13}$, $D_{14}$ and $D_{25}$ have been delivered to the second communication apparatus 30 permitted to decrypt the data C, and have not been delivered to the other second communication apparatus 30 not permitted to decrypt the data C. As a result, each of the second communication apparatus 30 permitted to decrypt the data C can appropriately generate the second device keys. On the other hand, the other second communication apparatus 30 neither can generate the second device keys, nor can decrypt the data C.

As described above, the data inside the transmission data 45 is configured of a combination of the data obtained by encrypting data to be transmitted, and the post-encrypted device keys obtained by encrypting the device keys used for the encryption of the data. This configuration makes it possible to suppress an increase in data size of transmission data, even when data to be transmitted is large in data size. In addition, as illustrated in FIG. 7, the data inside the transmission data 45 is configured of a set of the data itself, and information on the numerical value indicating the content of the transmission data. This configuration allows the second communication apparatus 30, which is a receiver, to decrypt data speedily and appropriately by using a unified processing method even when the number of data elements varies according to the number of the keys of the one-way function, and the number of the post-encrypted device keys.

The description returns to FIG. 6. The key generating section 620 and the key outputting section 630 function in a case where the concerned first communication apparatus 40 delegates the authority for the cryptographic communication to a different first communication apparatus 40. Specifically, upon reception of a request to delegate the authority for the cryptographic communication from the different first communication apparatus 40, the key generating section 620 performs a computation by passing the second device keys received from the managing apparatus 20 to the keyed one-way function to generate a computed result as third device keys. This key of the one-way function is preferably different from the key of the one-way function used for generating the second device keys in the managing apparatus 20. Then, to the different first communication apparatus 40 having requested to be authorized, the key outputting section 630 outputs these generated third device keys, the key of the one-way function received from the managing apparatus 20, and the key of the one-way function used in the computation performed by the key generating section 620 in the concerned first communication apparatus 40. A plurality of third device keys may be outputted in combination, and the combination of third device keys is called a device key set 48.

The concerned first communication apparatus 40 described above is directly authorized for the cryptographic communication by the managing apparatus 20. Instead of this, in order to receive the authority for the cryptographic communication from a different first communication apparatus 40, the concerned first communication apparatus 40 may receive the third device keys from the different first communication apparatus 40. In this case, specifically, the key generation controlling section 600 receives two keys of the one-way functions, and the third device keys from the different first communication apparatus 40. One of the two keys of the one-way function is the key of the one-way function for generating the second device keys from the first device keys, and the other is the key of the one-way function for generating the third device keys from the second device keys. Then, the key generation controlling section 600 transmits the received two keys of the one-way functions to the second communication apparatus 30, and causes the second communication apparatus 30 to perform a computation of applying the stored first device keys to the two one-way functions with the respective two keys sequentially, and thereby to generate a computed result as the third device keys. Thereafter, the cryptographic communication section 610 makes the cryptographic communication with second communication apparatus 30 by using the third device keys.

Figure 8A:
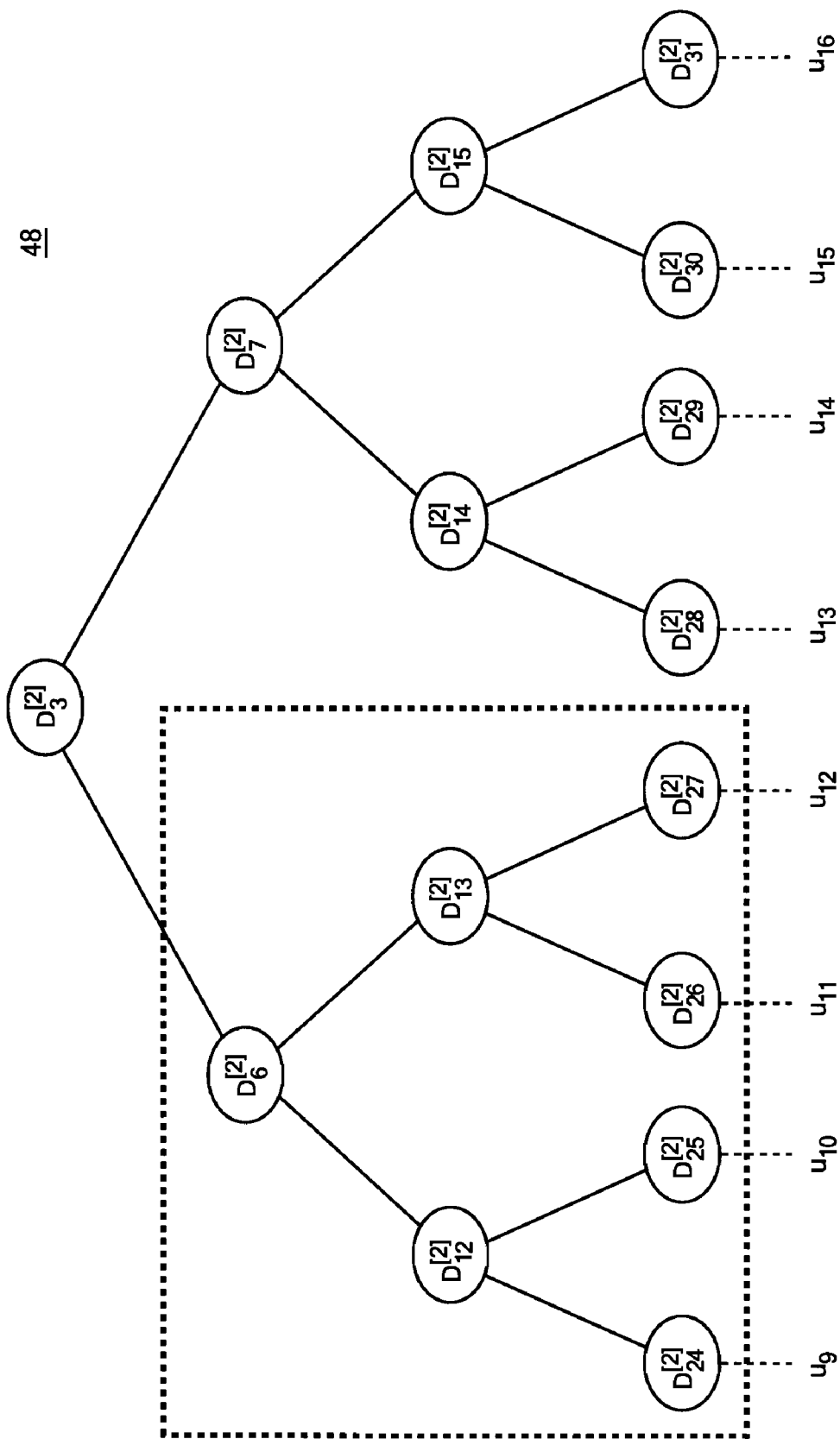
FIG. 8A shows a structure of a device key set 48 that is one example of third device keys.
Figures 8B, 9:
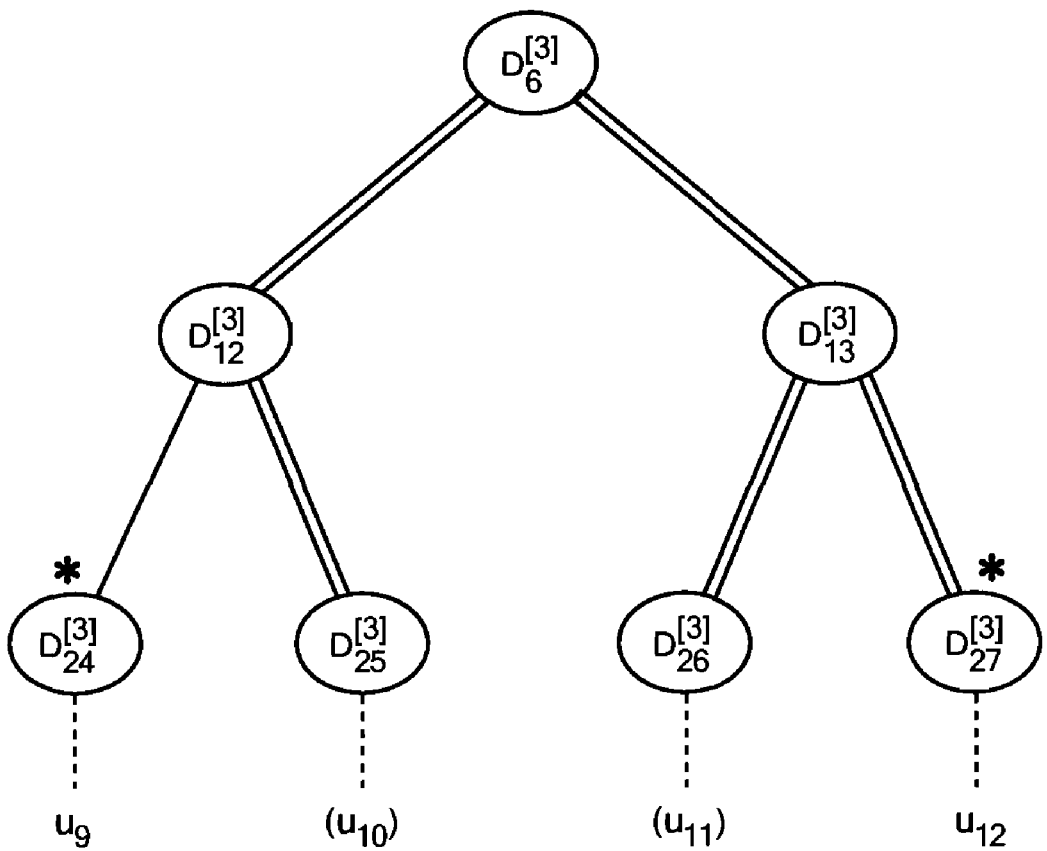
FIG. 8B shows a structure of fourth device keys outputted to a further different first communication apparatus 40.
FIG. 9 shows a specific example of transmission data encrypted by using device keys shown in FIG. 8B.

In this case, the key generating section 620 and the key outputting section 630 may also function if the concerned first communication apparatus 40 receives a request to delegate the authority for the cryptographic communication using the third device key from another different first communication apparatus 40 (called a further different first communication apparatus 40). More specifically, upon receipt of the request to delegate the authority for the cryptographic communication from the further different first communication apparatus 40, the key generating section 620 performs a computation by passing, to the keyed one-way function, the third device keys received from the different first communication apparatus 40, and generates a computed result as a fourth device keys. This key of the one-way function is preferably different from both of the key of the one-way function for generating the third device keys in the different first communication apparatus 40, and the key of the one-way function received by the different first communication apparatus 40. Then, to the further different first communication apparatus 40, the key outputting section 630 outputs the generated fourth device keys, the key of the one-way function received from the different first communication apparatus 40 and the key of the one-way function used in the computation performed by the key generating section 620 in the concerned first communication apparatus 40. Moreover, if the different first communication apparatus 40 further receives other keys of the one-way functions, the key outputting section 630 in the concerned first communication apparatus also outputs all the received keys to the further different first communication apparatus 40. FIGS. 8A and 8B shows the third device key and the fourth device key in comparison with each other.

FIG. 8A shows a structure of the device key set 48 that is one example of the third device keys. FIG. 8A shows a plurality of third device keys that the concerned first communication apparatus 40 generates respectively from all the second device keys owned by the concerned first communication apparatus 40, in response to a request from a different first communication apparatus 40. The third device key is expressed by adding a suffix [2] thereto in order to differentiate it from the first and second device key. The device key set 48 includes the third device keys $D^{[2]}_3$, $D^{[2]}_6$, $D^{[2]}_7$, $D^{[2]}_{12}$ to $D^{[2]}_{15}$ and $D^{[2]}_{24}$ to $D^{[2]}_{31}$ generated from the second device keys $D^{[1]}_3$, $D^{[1]}_6$, $D^{[1]}_7$, $D^{[1]}_{12}$ to $D^{[1]}_{15}$ and $D^{[1]}_{24}$ to $D^{[1]}_{31}$, respectively.

Upon reception of a request, from a further different first communication apparatus 40, to delegate the authority for the cryptographic communication using the third device keys shown in a rectangular drawn by a dotted line in FIG. 8A, the concerned first communication apparatus 40 generates and outputs the fourth device keys shown in FIG. 8B.

FIG. 8B shows a structure of the fourth device keys outputted to the further different first communication apparatus 40. The fourth device key is expressed by adding a suffix [3] thereto in order to differentiate it from the first to third device keys. The outputted fourth device keys are configured of the device keys $D^{[3]}_6$, $D^{[3]}_{12}$, $D^{[3]}_{13}$, $D^{[3]}_{24}$ and $D[3]_{27}$.

When the delegation of the authority for cryptographic communication is regarded as a parent-child relationship between authorizing and authorized apparatus, ancestor and descendent relationships from generation to generation may be configured. According to this embodiment, it is possible to achieve the delegation in such ancestor and descendent relationships in a number of generations without increasing the risk of leaking the first device keys.

Subsequently, one example of transmission data in the communication using the fourth device keys will be described by referring to FIGS. 8B and 9.

FIG. 9 shows a specific example of the transmission data encrypted by using the device keys shown in FIG. 8B. Here, suppose that the first communication apparatus 40 receiving the fourth device keys is to generate encrypted data which can be decrypted only by users $u_9$ and $u_{12}$, and which cannot be decrypted by the other users $u_{10}$ and $u_{11}$. In this case, the first communication apparatus 40 excludes the fourth device keys corresponding to the respective nodes in paths to the root node from the leaf nodes corresponding to the users $u_{10}$ and $u_{11}$, respectively. As a result, the remaining fourth device keys after the exclusion are device keys $D^{[3]}_{24}$ and $D^{[3]}_{27}$, and these keys are indicated with marks * in FIG. 8B. Thereafter, the key generation controlling section 600 of the first communication apparatus 40 adds a hash key 910 to the transmission data in order to cause the second communication apparatus 30, which is a transmission destination, to generate the fourth device key s. Here, the hash key 910 is a key of the one-way function received together with the fourth device keys. The hash key 910 includes the key Kh1 of the one-way function for generating the second device keys from the first device keys, the key Kh2 of the one-way function for generating the third device keys from the second device keys, and the key Kh3 of the one-way function for generating the fourth device keys from the third device keys. Incidentally, since the transmission data shown in FIG. 9 includes the three keys of the one-way functions, a numerical value 3 indicating the number of keys is included at the head of the transmission data.

In addition, in order to allow the users $u_9$ and $u_{12}$ to decrypt data C' to be transmitted, the cryptographic communication section 610 encrypts, by using each of the selected device keys $D^{[3]}_{24}$ and $D^{[3]}_{27}$, the title key Kt' used for encrypting the data C', thereby generating each of post-encrypted device keys 920, and then include these keys 920 in the transmission data. In addition, the cryptographic communication section 610 generates an encrypted content 930 obtained by encrypting the data C' to be transmitted, by using the title key Kt', and includes this encrypted content 930 at the end of the transmission data. Upon reception of this, a key generating section 1020 in the second communication apparatus 30 performs a computation by applying the stored first device key $D_{24}$ to a plurality of one-way functions respectively with the keys Kh1 to Kh3 sequentially, and generates a computed result as the fourth device key $D^{[3]}_{24}$. This computation is expressed as shown in the following equation.

$$D^{[3]}_{24}=H(Kh3, H(Kh2, bH(Kh1, D_{24})))$$

Thereafter, a cryptographic communication section 1030 in the second communication apparatus 30 decrypts the post-encrypted device keys by using this fourth device key $D^{[3]}_{24}$, and generates the title key Kt'. After that, the cryptographic communication section 1030 obtains data C' by decrypting the encrypted content 930 with the generated title key Kt'. This computation is expressed as shown in the following equation.

$$C''=Dec(Dec(D^{[3]}_{24}, Enc(D^{[3]}_{24}, Kt')), Enc(Kt', C'))$$

Data C" thus generated from the above equation is identical with the data C', which means that the second communication apparatus 30 has succeeded in the proper decryption of the data.

As has been described hereinabove by referring to FIGS. 8A and 8B, and FIG. 9, the authority for the cryptographic communication can be sequentially delegated from the managing apparatus 20 to a plurality of first communication apparatus 40 in a number of generations. The cryptographic communication can be appropriately performed by using the delegated device keys. Moreover, in this example, the authority for the cryptographic communication is delegated from one managing apparatus 20 in serial paths through the plurality of first communication apparatus 40. Instead of this, it should be noted that one managing apparatus 20 or one first communication apparatus 40 may delegate the authority for the cryptographic communication to a plurality of first communication apparatus 40 in parallel. Furthermore, one first communication apparatus 40 may delegate authorities for overlapping cryptographic communication to the respective other first communication apparatus 40. In this way, according to the authority delegation method shown in this embodiment, it is possible to flexibly distribute the authorities for the cryptographic communication to a plurality of first communication apparatus 40.

Figure 10:
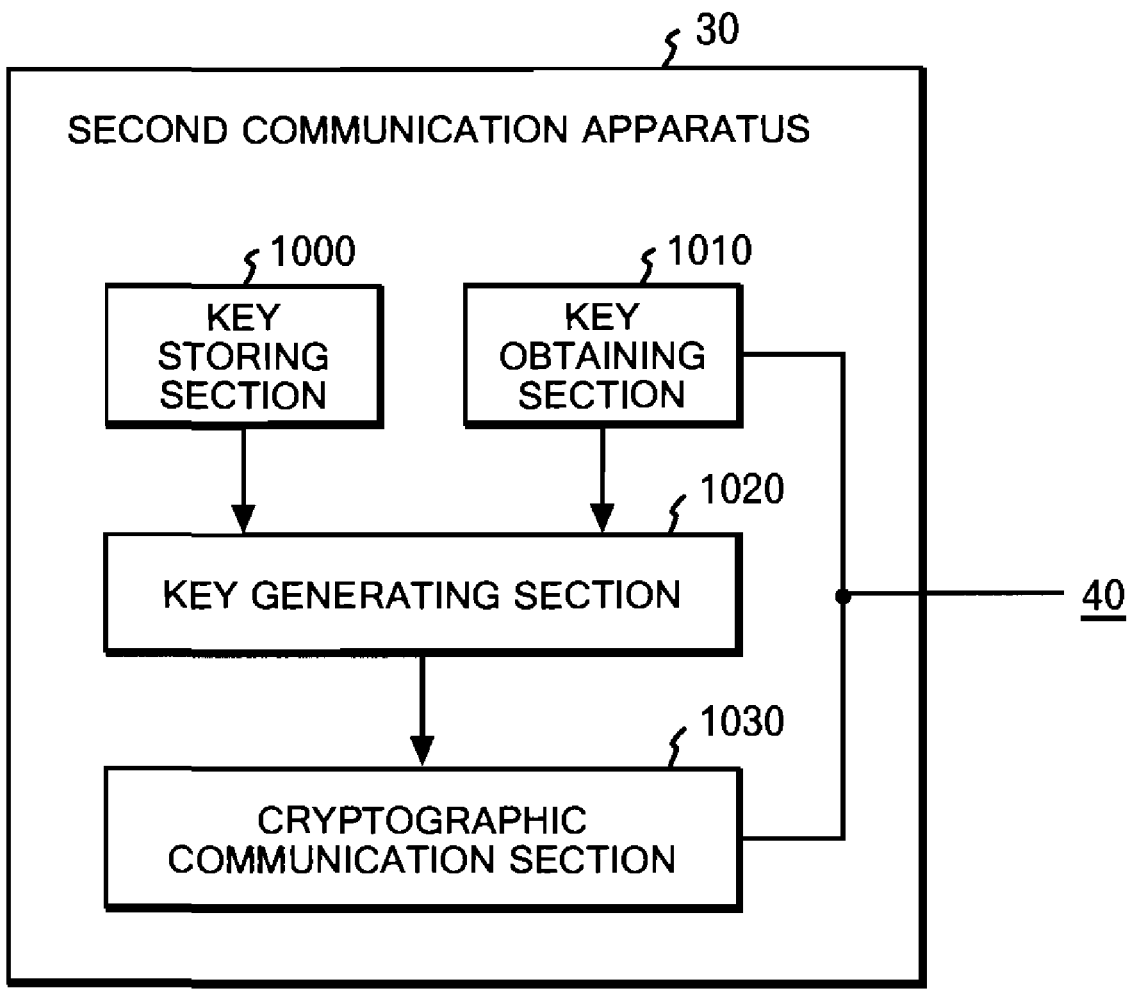
FIG. 10 shows one example of a functional configuration of the second communication apparatus 30.

FIG. 10 shows one example of a functional configuration of one of the second communication apparatus 30. The second communication apparatus 30 includes a key storing section 1000, a key obtaining section 1010, the key generating section 1020 and a cryptographic communication section 1030. The key storing section 1000 stores the first device keys shared with the managing apparatus 20. Specifically, in the multiway tree shown in FIG. 3, the key storing section 1000 stores all the first device keys in the path to the root node from the leaf node corresponding to this second communication apparatus 30. These first device keys are preferably device keys that are managed in the second communication apparatus 30 so as not to be readable and rewritable from the outside. The key obtaining section 1010 obtains the key of the keyed one-way function to which the managing apparatus 20 generates the second device key by passing the first device key in order to allow the concerned second communication apparatus 30 to communicate with the first communication apparatus 40. As described above, this key may be included in the transmission data to be received containing the encrypted content. Moreover, the key obtaining section 1010 may obtain two keys when generating the third device key, and three keys when generating the fourth device key.

The key generating section 1020 generates the second device key by performing a computation by passing the first device key stored in the key storing section 1000 to the keyed one-way function obtained by the key obtaining section 1010. In a case where a plurality of keys of the one-way functions are obtained, the key generating section 1020 may perform a computation by applying the first device key to the plurality of one-way functions with the respective keys sequentially, in order to generate the third device key or the fourth device key. Moreover, in a case where a plurality of first device keys are stored, the key generating section 1020 may generate a plurality of second device keys by applying the first device keys to the one-way functions, respectively. The cryptographic communication section 1030 performs the cryptographic communication with the first communication apparatus 40 by using the generated second device key (or the third or fourth device key).

Figure 11:
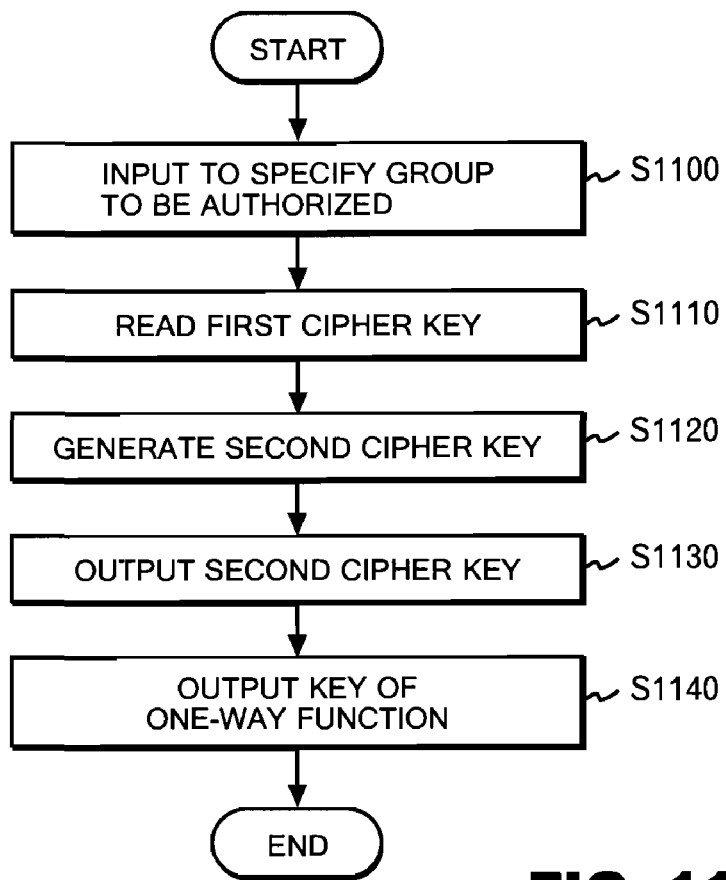
FIG. 11 shows a flow of processing in which the managing apparatus 20 delegates authority for cryptographic communication to the first communication apparatus 40.

FIG. 11 shows a flow of processing in which the managing apparatus 20 delegates the authority for the cryptographic communication to one of the first communication apparatus 40. The key generating section 210 receives a request to delegate the authority for the cryptographic communication with a plurality of second communication apparatus 30 from the first communication apparatus 40 (S1100). For example, the key generating section 210 may receive an input specifying some of the plurality of second communication apparatus 30 to be enabled to decrypt encrypted data broadcasted by the first communication apparatus 40, or may receive an input specifying a group of the second communication apparatus 30 to be enabled to decrypt the encrypted data. When some second communication apparatus 30 are specified, the key generating section 210 reads, from the key storing section 200, the first device keys shared with the specified second communication apparatus 30 (S1110). When a group of the second communication apparatus 30 to be enabled to decrypt the encrypted data is specified, the key generating section 210 reads, from the key storing section 200, all the first device keys in subtrees including the specified group in a multiway tree as shown in FIG. 3.

The key generating section 210 performs a computation by passing each of the first device keys to the keyed one-way function, and generates a computed result as a corresponding one of the second device keys (S1120). Then, the key outputting section 230 outputs the generated second device keys to the first communication apparatus 40 that has requested to be authorized (S1130). In addition, the key outputting section 230 outputs the key of the one-way function to the first communication apparatus 40 for the purpose of causing the second communication apparatus 30 to receive the key of the one-way function, and then to generate the second device keys (S1130). Thus, in this embodiment, the key outputting section 230 outputs the key of the one-way function to the first communication apparatus 40. Instead of this, the key outputting section 230 may bypass the first communication apparatus 40, and directly output the key of the one-way function to the second communication apparatus 30.

Figure 12:
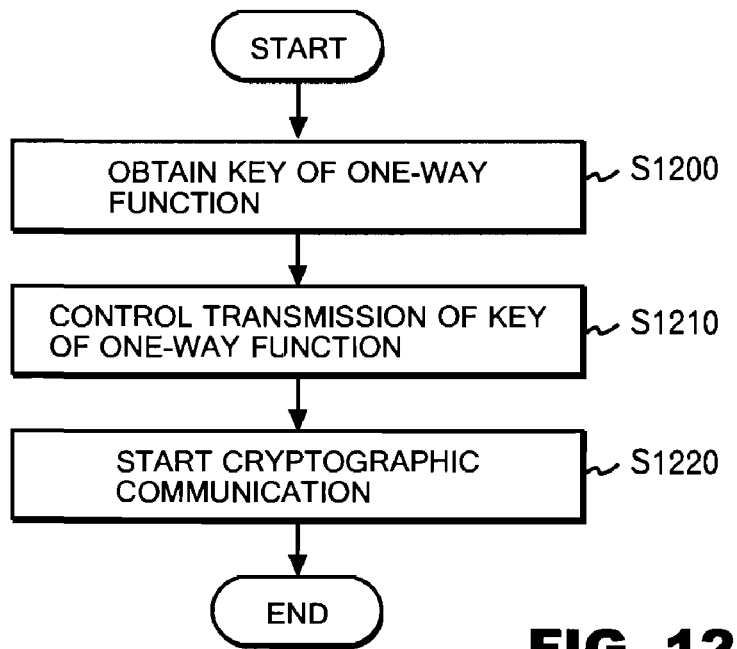
FIG. 12 shows a flow of processing until the first communication apparatus 40 starts to perform the cryptographic communication in accordance with the delegated authority.

FIG. 12 shows a flow of processing before the first communication apparatus 40 starts the cryptographic communication in accordance with the delegated authority. To the managing apparatus 20, the key generation controlling section 600 transmits a request to delegate the authority for the cryptographic communication while specifying a group of second communication apparatus 30, and thereby obtains the plurality of second device keys and the key of the one-way function used for generating the second device keys from the managing apparatus 20 (S1200). Then, the key generation controlling section 600 transmits the obtained key of the one-way function to the specified group (S11210), and thereby causes each of the second communication apparatus 30 in the group to perform a computation by passing the stored first device key s to the keyed one-way function, and thus to generate the second device keys. The key generation controlling section 600 may not have to perform this processing immediately after obtaining the keys, but may be set to transmit the keys by including them in transmission data at a starting time of the cryptographic communication. Thereafter, the cryptographic communication section 610 encrypts data by using the second device keys received from the managing apparatus 20, and broadcasts the encrypted data to each of the second communication apparatus 30. In this way, the cryptographic communication section 610 starts the cryptographic communication only with the second communication apparatus 30 in the specified group (S1220).

Figure 13:
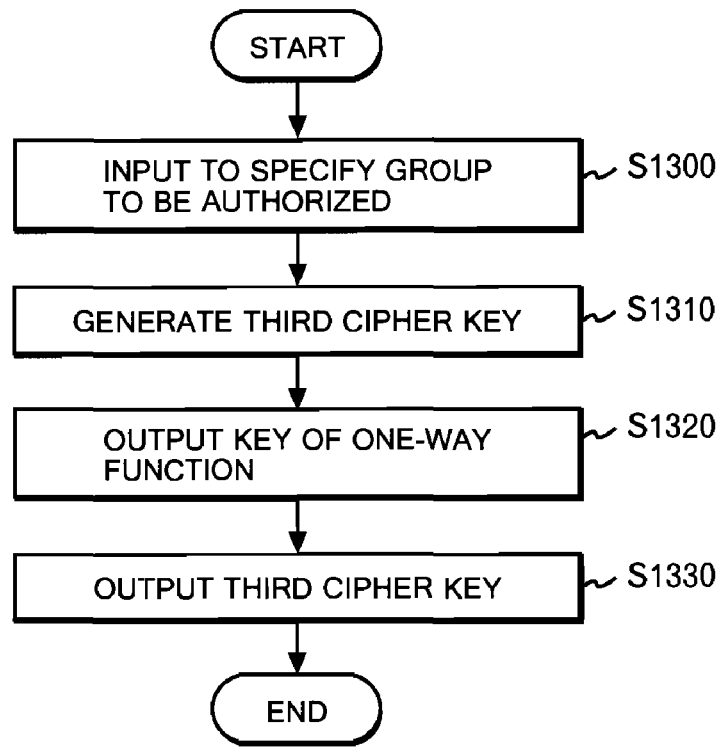
FIG. 13 shows a flow of processing in which the first communication apparatus 40 delegates the authority for the cryptographic communication to a different first communication apparatus 40.

FIG. 13 shows a flow of processing in which the first communication apparatus 40 further delegates the authority for the cryptographic communication to a different first communication apparatus 40. The key generating section 620 receives a request to delegate the authority for the cryptographic communication from the different first communication apparatus 40 (S1300). Thereafter, the key generating section 620 performs a computation by passing each of the second device keys received from the managing apparatus 20 to the keyed one-way function, and generates a computed result as the third device keys (S1310). Subsequently, to the different first communication apparatus 40 having requested to be authorized, the key outputting section 630 outputs the key of the one-way function received from the managing apparatus 20, and the key of the one-way function used for the computation of generating each of the third device keys (S1320). Subsequently, the key outputting section 630 outputs the generated third device keys to the different first communication apparatus 40 (S1330).

Figure 14:
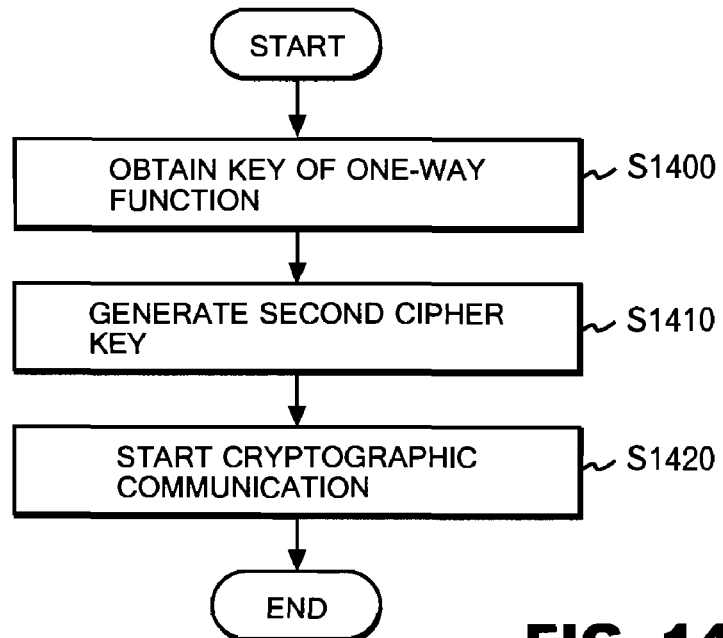
FIG. 14 shows a flow of processing in which the second communication apparatus 30 perform the cryptographic communication with the first communication apparatus 40.

FIG. 14 shows a flow of processing in which one of the second communication apparatus 30 starts the cryptographic communication with the first communication apparatus 40. The key obtaining section 1010 obtains the key of the keyed one-way function which the managing apparatus 20 has used to generate the second device keys by passing the first device keys thereto for the purpose of allowing the second communication apparatus 30 to communicate with the first communication apparatus 40 (S1200). These keys may be included in transmission data containing an encrypted content as described above, and thus be received. The key generating section 1020 generates each of a plurality of second device keys by performing a computation by passing each of the plurality of first device keys stored in the key storing section 1000 to the keyed one-way function obtained by the key obtaining section 1010 (S1410). Thereafter, the cryptographic communication section 1030 starts the cryptographic communication with the first communication apparatus 40 by using these second device keys (S1420).

In the foregoing description, one of the first communication apparatus requests authorization to the managing apparatus or a different first communication apparatus. Conversely, the managing apparatus that is an authorizing source, and the different first communication apparatus may determine a range to which the managing apparatus delegates the authority, and may perform processing for the delegation.

Figure 15:
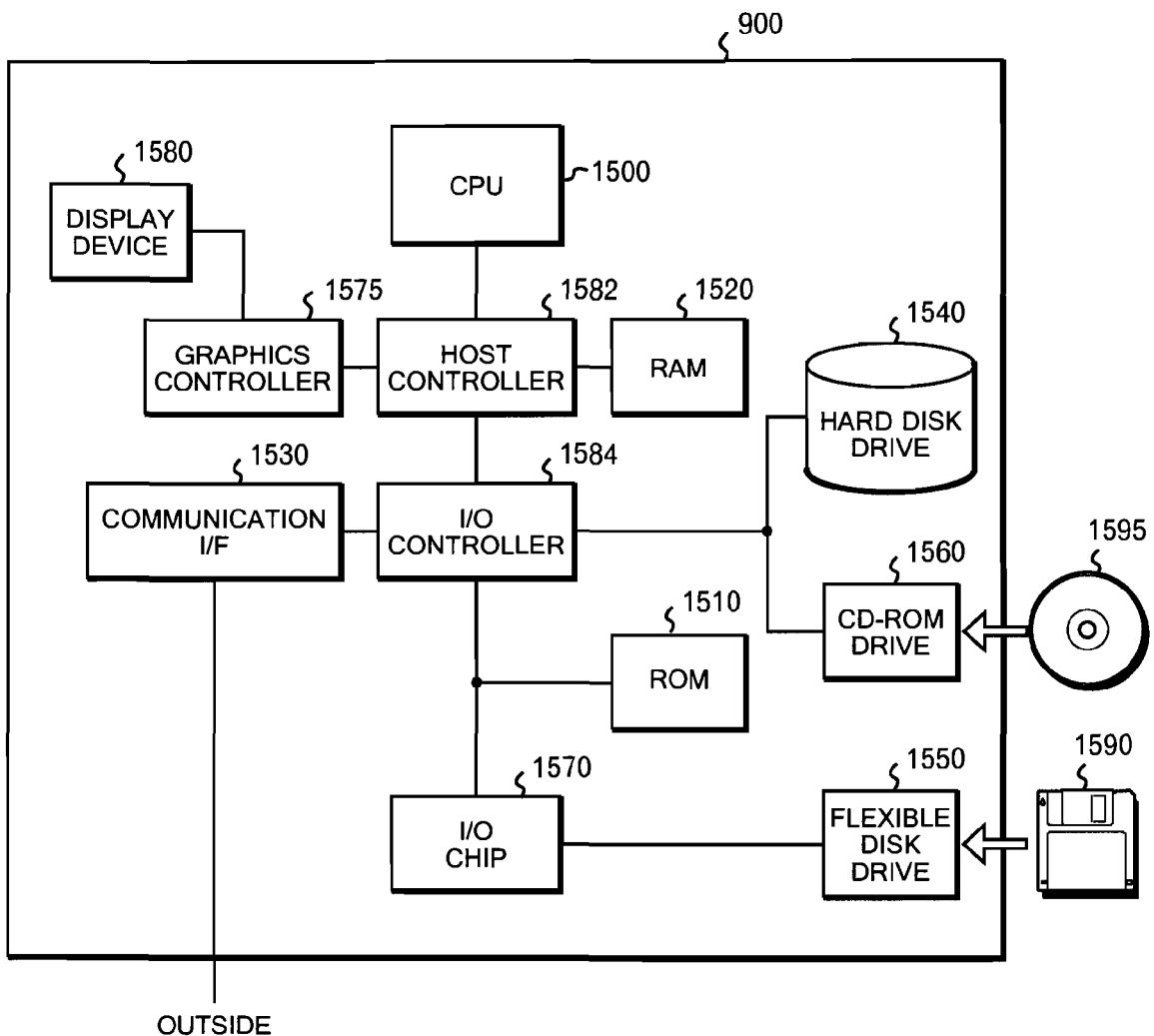
FIG. 15 shows one example of a hardware configuration of an information processing apparatus 900 that functions as the managing apparatus 20, the second communication apparatus 30 or the first communication apparatus 40.

FIG. 15 shows an example of a hardware configuration of an information processing apparatus 900 functioning as the managing apparatus 20, the second communication apparatus 30 or the first communication apparatus 40. The information processing apparatus 900 includes a CPU peripheral unit, an input/output unit and a legacy input/output unit. The CPU peripheral unit includes a CPU 1500, a RAM 1520 and a graphics controller 1575, all of which are mutually connected to one another via a host controller 1582. The input/output unit includes a communication interface 1530, a hard disk drive 1540 and a CD-ROM drive 1560, all of which are connected to the host controller 1582 via an input/output controller 1584. The legacy input/output unit includes a ROM 1510, a flexible disk drive 1550 and an input/output chip 1570, all of which are connected to the input/output controller 1584.

The host controller 1582 connects the RAM 1520 to the CPU 1500 and the graphics controller 1575, both of which access the RAM 1520 at a high transfer rate. The CPU 1500 is operated according to programs stored in the ROM 1510 and the RAM 1520, and controls each of the components. The graphics controller 1575 obtains image data generated by the CPU 1500 or the like in a frame buffer provided in the RAM 1520, and causes the obtained image data to be displayed on a display device 1580. In place of this, the graphics controller 1575 may internally include a frame buffer in which the image data generated by the CPU 1500 or the like is stored.

The input/output controller 1584 connects the host controller 1582 to the communication interface 1530, the hard disk drive 1540 and the CD-ROM drive 1560, all of which are relatively high-speed input/output devices. The communication interface 1530 communicates with an external device via a network. In the hard disk drive 1540, programs and data to be used by the information processing apparatus 900 are stored. The CD-ROM drive 1560 reads a program or data from a CD-ROM 1595, and provides the read-out program or data to the RAM 1520 or the hard disk 1540.

Moreover, the input/output controller 1584 is connected to relatively low-speed input/output devices such as the ROM 1510, the flexible disk drive 1550 and the input/output chip 1570. In the ROM 1510, stored are programs such as a boot program executed by the CPU 1500 at a start-up time of the information processing apparatus 900 and a program depending on hardware of the information processing apparatus 900. The flexible disk drive 1550 reads a program or data from a flexible disk 1590, and provides the read-out program or data to the RAM 1520 or the hard disk drive 1540 via the input/ output chip 1570. The input/output chip 1570 is connected to the flexible disk drive 1590 and various kinds of input/output devices, for example, through a parallel port, a serial port, a keyboard port, a mouse port and the like.

A program to be provided to the information processing apparatus 900 is provided by a user with the program stored in a storage medium such as the flexible disk 1590, the CD-ROM 1595 and an IC card. The program is read from the storage medium via the input/output chip 1570 and/or the input/output controller 1584, and is installed and executed on the information processing apparatus 900. Since an operation that the program causes the information processing apparatus 900 or the like to execute is identical to the operation of the managing apparatus 20, the second communication apparatus 30 or the first communication apparatus 40 described by referring to FIGS. 1 to 14, the description thereof is omitted here.

The program described above may be stored in an external storage medium. As the storage medium, any one of the following mediums may used: an optical storing medium such as a DVD or a PD; a magneto-optic storing medium such as a MD; a tape medium; and a semiconductor memory such as an IC card, in addition to the flexible disk 1590 and the CD-ROM 1595. Alternatively, the program may be provided to the information processing apparatus 900 via a network, by using, as a storage medium, a storage device such as a hard click and a RAM provided in a server system connected to a private communication network or the Internet.

As has been described, according to information system 10 and the second communication apparatus 30 in this embodiment hereinabove, an apparatus already sharing a device key with other apparatus that are transmission destinations can delegate authority for cryptographic communication to each of the other apparatus without increasing the risk of leaking the device key. In this way, even in a case where the device key is managed so as not to be rewritable in the second communication apparatus 30, that is, where it is extremely difficult to change the device key to another one, once the device key is leaked, it is possible to delegate the authority for the cryptographic communication. As a result, a processing load for encryption centralized to the managing apparatus 20 can be distributed to a plurality of first communication apparatus 40. In addition, even when the authorized first communication apparatus 40 improperly manages the confidentiality, thereby allowing a device key to be leaked and to be abused, it is possible to immediately stop using the device key, and to generate a new device key again.

Hereinabove, the present invention has been described by using the embodiment. However, the technical scope of the present invention is not limited to the above-described embodiment. It is obvious to one skilled in the art that various modifications and improvements may be made to the embodiment. Moreover, it is also obvious from the scope of the present invention that thus modified and improved embodiments are included in the technical scope of the present invention.

What is claimed is:

1. A method for managing a device key for cryptographic communication, and for performing cryptographic communication between a first communication apparatus and a second communication apparatus, comprising the steps of:
   storing first device keys shared with the second communication apparatus in a memory;
   generating a computed result as second device keys by performing a computation by passing the first device keys read from the memory to a keyed one-way function; and
   outputting the second device keys to the first communication apparatus in order to allow the first communication apparatus and the second communication apparatus to make the cryptographic communication with each other by using second device keys, and outputting the key of the one-way function to the first communication apparatus in order for the second communication apparatus to receive the key.

2. The method according to claim 1, wherein the first device keys are stored in a key storing section of a managing apparatus;
   the managing apparatus comprising:
   a key storing section that stores a first device key shared with the second communication apparatus;
   a key generating section that performs a computation by passing the first device key read from the key storing section to a keyed one-way function to generate a computed result as a second device key;
   a key outputting section that outputs the second device key and a key of the one-way function to the first communication apparatus;
   the first communication apparatus comprising:
   a key generation controlling section that transmits to the second communication apparatus, the key of the one-way function received from the managing apparatus, and which thereby causes the second communication apparatus to perform a computation by passing the stored first device key to the keyed one-way function, and thus to generate a second device key; and
   a cryptographic communication section that performs the cryptographic communication with the second communication apparatus by using the second device key received from the managing apparatus.

3. The method according to claim 2, wherein,
   in order to selectively enable at least one of a plurality of second communication apparatus to decrypt encrypted data broadcasted to the plurality of second communication apparatus, the key storing section stores a plurality of first device keys, each shared by the managing apparatus and the at least one of the second communication apparatus;
   the key generating section receives an input specifying at least one of the plurality of second communication apparatus to be enabled to decrypt encrypted data broadcasted by the first communication apparatus, reads the first device keys, each shared with the specified second communication apparatus from the key storing section, and generates, as second device keys, a computed result by performing a computation by passing each of the first device keys to the keyed one-way function;
   the key generation controlling section broadcasts to the plurality of second communication apparatus keys of the one-way function received from the managing apparatus, and
   the cryptographic communication section performs cryptographic communication with the specified second communication apparatus, by encrypting and broadcasting data by using the second device keys received from the managing apparatus.

4. The method according to claim 3, wherein
   the key storing section stores the plurality of first device keys in association with different nodes of a multiway tree structure data one to one;
   leaf nodes of the multiway tree structure data are associated with the second communication apparatus one to one;
   first device keys delivered in advance to each of the second communication apparatus, said first device keys corresponding to nodes in a path from the leaf nodes corresponding to the second communication apparatus to the root node;

the key generating section receives an input specifying a group of second communication apparatus to be enabled to decrypt encrypted data broadcasted by the first communication apparatus, reads, from the key storing section, each of the first device keys in subtrees including the specified group in the multiway tree, performs a computation by passing each of the first device keys to the keyed one-way function to generate a computed result as a corresponding second device key;

the key outputting section outputs each of the second device keys and the key of the one-way function to the first communication apparatus, the key generation controlling section transmits the key of the one-way function received from the managing apparatus to the specified group, and causes each of the second communication apparatus in the group to perform a computation by passing the stored first device key to the keyed one-way function to generate the second device key, and the cryptographic communication section encrypts data by using at least one of the plurality of second device keys received from the managing apparatus, and thereby performs cryptographic communication with at least one of the second communication apparatus in the specified group.

5. The method according to claim 4, wherein the cryptographic communication section generates post-encrypted device keys by encrypting title keys used for encrypting data with second device keys generated from first device keys, and then broadcasts the post-encrypted device attached to the encrypted data, the first device keys having already been delivered to at least one of the second communication apparatus to be enabled to decrypt the data, but having not been delivered to the other second communication apparatus, and the key generation controlling section further attaches the key of the one-way function received from the managing apparatus to the data to be broadcasted by the cryptographic communication section, and then transmits the key and the data.

6. The method according to claim 3, the managing apparatus further comprising a leakage managing section which receives an input indicating one of the plurality of first device keys that has become unusable as a result of leakage thereof to a third party, and which notifies the first communication apparatus that the second device key generated from the indicated first device key by the key generating section is invalidated.

7. The method according to claim 2, comprising a plurality of first communication apparatus, wherein the first communication apparatus receiving the second device key further comprises:

a key generating section for performing a computation by passing the second device key received from the managing apparatus to a keyed one-way function to generate a computed result as a third device key;

a key outputting section for outputting, to a different first communication apparatus, the third device key, the key of the one-way function received from the managing apparatus, and the key of the one-way function that the first communication apparatus has used for the computation performed by the key generating section, in the different first communication apparatus receiving the third device key, the key generation controlling section transmits the received two keys of the respective one-way functions to the second communication apparatus, and causes the second communication apparatus to generate a computed result as a third device key by performing a computation in which the stored first device key is passed to the two one-way functions with the respective two keys sequentially, and the cryptographic communication section performs cryptographic communication with the second communication apparatus by using the received third device key.

8. The method according to claim 2, wherein the first device keys are the device key managed in the second communication apparatus so as not to be readable and rewritable from outside.

9. The method according to claim 2, the managing apparatus further comprising a leakage managing section which encrypts the key of the one-way function by using the first device key in response to an input indicating that the second device key has become unusable in cryptographic communication as a result of leaking thereof to a third party, which transmits the encrypted key to the second communication apparatus, and which thus notifies the second communication apparatus that the second device key generated by using the key of the one-way function is unusable.

10. A method for managing a device key for cryptographic communication, and for performing cryptographic communication between a first communication apparatus and a second communication apparatus, comprising the steps of:

storing first device keys shared with the second communication apparatus in a memory;

generating a computed result as second device keys by performing a computation by passing the first device keys read from the memory to a keyed one-way function; and outputting the second device keys to the first communication apparatus in order to allow the first communication apparatus and the second communication apparatus to make the cryptographic communication with each other by using second device keys, and outputting the key of the one-way function to the first communication apparatus in order for the second communication apparatus to receive the key, wherein the first device keys are stored in a managing apparatus;

the managing apparatus comprising:

a key storing section that stores a first device key shared with the second communication apparatus;

a key generating section that performs a computation by passing the first device key read from the key storing section to a keyed one-way function to generate a computed result as a second device key;

a key outputting section that outputs the second device key and a key of the one-way function to the first communication apparatus;

the first communication apparatus comprising:

a key generation controlling section that transmits to the second communication apparatus, the key of the one-way function received from the managing apparatus, and which thereby causes the second communication apparatus to perform a computation by passing the stored first device key to the keyed one-way function, and thus to generate a second device key; and a cryptographic communication section that performs the cryptographic communication with the second communication apparatus by using the second device key received from the managing apparatus;

in order to selectively enable at least one of a plurality of second communication apparatus to decrypt encrypted data broadcasted to the plurality of second communication apparatus, the key storing section stores a plurality of first device keys, each shared by the managing apparatus and the at least one of the second communication apparatus;

the key generating section receives an input specifying at least one of the plurality of second communication apparatus to be enabled to decrypt encrypted data broadcasted by the first communication apparatus, reads the first device keys, each shared with the specified second communication apparatus from the key storing section, and generates, as second device keys, a computed result by performing a computation by passing each of the first device keys to the keyed one-way function;

the key generation controlling section broadcasts to the plurality of second communication apparatus keys of the one-way function received from the managing apparatus;

the cryptographic communication section performs cryptographic communication with the specified second communication apparatus, by encrypting and broadcasting data by using the second device keys received from the managing apparatus;

the key storing section stores the plurality of first device keys in association with different nodes of a multiway tree structure data one to one;

leaf nodes of the multiway tree structure data are associated with the second communication apparatus one to one;

first device keys delivered in advance to each of the second communication apparatus, said first device keys corresponding to nodes in a path from the leaf nodes corresponding to the second communication apparatus to the root node;

the key generating section receives an input specifying a group of second communication apparatus to be enabled to decrypt encrypted data broadcasted by the first communication apparatus, reads, from the key storing section, each of the first device keys in subtrees including the specified group in the multiway tree, performs a computation by passing each of the first device keys to the keyed-one way function to generate a computed result as a corresponding second device key;

the key outputting section outputs each of the second device keys and the key of the one-way function to the first communication apparatus;

the key generation controlling section transmits the key of the one-way function received from the managing apparatus to the specified group, and causes each of the second communication apparatus in the group to perform a computation by passing the stored first device key to the keyed one-way function to generate the second device key;

the cryptographic communication section encrypts data by using at least one of the plurality of second device keys received from the managing apparatus, and thereby performs cryptographic communication with at least one of the second communication apparatus in the specified group;

the cryptographic communication section generates post-encrypted device keys by encrypting title keys used for encrypting data with second device keys generated from first device keys, and then broadcasts the post-encrypted device attached to the encrypted data, the first device keys having already been delivered to at least one of the second communication apparatus to be enabled to decrypt the data, but having not been delivered to the other second communication apparatus;

the key generation controlling section further attaches the key of the one-way function received from the managing apparatus to the data to be broadcasted by the cryptographic communication section, and then transmits the key and the data;

the managing apparatus further comprising a leakage managing section which receives an input indicating one of the plurality of first device keys that has become unusable as a result of leakage thereof to a third party, and which notifies the first communication apparatus that the second device key generated from the indicated first device key by the key generating section is invalidated;

a plurality of first communication apparatus, wherein the first communication apparatus receiving the second device key further comprises:

a key generating section for performing a computation by passing the second device key received from the managing apparatus to a keyed one-way function to generate a computed result as a third device key;

a key outputting section for outputting, to a different first communication apparatus, the third device key, the key of the one-way function received from the managing apparatus, and the key of the one-way function that the first communication apparatus has used for the computation performed by the key generating section;

in the different first communication apparatus receiving the third device key;

the key generation controlling section transmits the received two keys of the respective one-way functions to the second communication apparatus, and causes the second communication apparatus to generate a computed result as a third device key by performing a computation in which the stored first device key is passed to the two one-way functions with the respective two keys sequentially;

the cryptographic communication section performs cryptographic communication with the second communication apparatus by using the received third device key, and the first device keys are the device key managed in the second communication apparatus so as not to be readable and rewritable from outside.

\* \* \* \* \*